United States Patent [19]

Hughey

[11] 4,058,880
[45] Nov. 22, 1977

[54] PROPELLER MAKING APPARATUS AND METHOD

[76] Inventor: Emerson Dee Hughey, 840 E. 64th St., Indianapolis, Ind. 46240

[21] Appl. No.: 733,345

[22] Filed: Oct. 18, 1976

Related U.S. Application Data

[62] Division of Ser. No. 679,984, April 26, 1976, Pat. No. 4,009,874.

[51] Int. Cl.² ............................................. B23P 15/04
[52] U.S. Cl. ................................................ 29/156.8 P
[58] Field of Search ..................... 29/156.8 P, 156.8 R, 29/23.5; 269/296, 297, 287, 303, 321 W, 3, 156, 54.5; 228/44.1, 49

[56] References Cited

U.S. PATENT DOCUMENTS

| 1,551,342 | 8/1925 | Steenstrup | 29/156.8 R |
| 2,013,705 | 9/1935 | Warren | 29/156.8 P |
| 2,392,281 | 1/1946 | Allen | 29/156.8 R |
| 2,454,580 | 11/1948 | Thielemann | 29/156.8 R |
| 2,468,884 | 5/1949 | L'esperance et al. | 269/296 |
| 2,475,772 | 7/1949 | Allen et al. | 29/156.8 R |
| 2,654,143 | 10/1953 | Hoesch et al. | 29/156.8 R |
| 3,056,369 | 10/1962 | Roth | 269/296 |
| 3,830,488 | 8/1974 | Wilger et al. | 269/296 |

*Primary Examiner*—C.W. Lanham
*Assistant Examiner*—Daniel C. Crane

*Attorney, Agent, or Firm*—Jenkins, Coffey & Hyland

[57] ABSTRACT

Apparatus and method for making propellers having a base plate with an upstanding central shaft for receiving a blank propeller hub. A plurality of blocks are radially arranged on the plate about the central shaft, and each block has an upwardly projecting pin near one end thereof. The blocks each have vertical set screws therethrough opposite their pins to allow swingable movement to adjust the pin radial distances from the central shaft. The heads of said set screws are positioned on the top of said blocks, and provide positioning means for locating a cylindrical collar on said blocks. The collar has a plurality of radially arranged and adjustable arms, one for each block, extending inwardly therefrom, with each of said arms having a collet thereon with an inwardly presented slotted face.

A propeller is made by positioning a plurality of propeller blade blanks each with its root in contact with the blank hub and its tip resting upon one of said blocks in contact with the pin thereon. The collar arms are adjusted for reception of the leading edge of each blade blank in one of the slotted collets. Then, the collet is rotated with respect to the blocks and central shaft to adjust the pitch angle of the blade blanks with repsect to the hub. When the desired pitch angle is obtained, the blanks are connected to the hub, as by soldering, brazing, etc.

6 Claims, 11 Drawing Figures

PROPELLER MAKING APPARATUS AND METHOD

This is a division application Ser. No. 679,984, filed Apr. 26, 1976, now U.S. Pat. 4,009,874.

BACKGROUND OF THE INVENTION

This invention relates to apparatus and method for making propellers. More specifically, this invention relates to an apparatus and method for quickly and easily making boat propellers from a hub and a plurality of blade blanks wherein the propeller has a selected blade pitch angle.

In the prior art, a wide variety of propeller designs are available for marine uses. That is, propellers are made having different overall diameters, different numbers of propeller blades, different blade pitch angles, different blade shapes or curvatures, and different blade sweep back angles. These design differences result from an attempt to match propeller operating characteristics to the particular propulsion needs of a given boat. Thus, the ideal design of a propeller depends upon the hull shape, size, and weight of the boat together with the desired average operating conditions of that boat. For example, in some boats such as radio controlled model racing boats, the propeller and the boat must be accurately matched with each other in order to achieve optimum speed and control.

Throughout the prior art, propellers large and small have traditionally been formed from one-piece metal castings. This is especially true with small propellers used with model racing boats. That is, the propeller blades and hub comprise a unitary piece of cast metal, with such metals as aluminum, stainless steel, berylium bronze, etc. being popularly employed. Cast propellers, however, are formed with one fixed set of design characteristics, such as blade pitch angle and number of blades, etc. Thus, if a given propeller does not optimally match a particular boat, the only way to change the propeller design characteristics is to bend or grind the blades. However, blade bending is inaccurate and tends to weaken the blades, and blade grinding is wholly irreversible. Unfortunately, the only other alternative is to purchase additional propellers until one with satisfactory design characteristics is found. As a practical matter, this is a lengthy and costly trial and error process. The propeller which is finally chosen is often only satisfactory, and does not achieve optimal boat performance.

It is therefore the object of this invention to provide apparatus and method for making a boat propeller from a hub and a plurality of blade blanks wherein the propeller has an individually chosen selected set of design characteristics. Further, it is the object of this invention to provide propeller making apparatus and method for making propellers of different sizes and shapes, and propellers which can be taken apart and reassembled as needed to meet different design criteria.

SUMMARY OF THE INVENTION

In accordance with the invention, propeller making apparatus and method is provided comprising a base plate having an upstanding central shaft. The shaft receives thereover a blank propeller hub of the desired size and at the desired elevation thereon. A plurality of blocks corresponding in number to the desired number of propeller blades are radially spaced about the shaft, and have pins extending upwardly from the tops thereof at a selected radial distance from the central shaft. The blocks also have positioning means extending upwardly therefrom for positioning a cylindrical collar thereon. The collar has a plurality of radially arranged and inwardly extending arms corresponding in number to the desired number of propeller blades, and positioned in a horizontal plane above the blocks. Each of said arms has a collet thereon with a slot opening toward the central shaft.

The selected number of blade blanks are positioned each with its root in contact with the hub, and its tip resting upon one of the blocks in contact with the pin thereon. Each collet is adjusted to receive the leading edges of one of the propeller blades in its slot. Thus, the propeller blades are each supported at the same pitch angle with respect to the hub and at three contact points to prevent said blades from become dislodged. Then, the collar is rotated with respect to the blocks and hub to cause the leading edges of the blades to slide within the collet slots, and thereby simultaneously raise or lower the blade blanks to alter the propeller pitch angle. Finally, when the desired pitch angle is obtained, the blade blanks are secured to the hub as by silver soldering, brazing, etc.

BRIEF DESCRIPTION OF THE DRAWINGS

The accompanying drawings illustrate the invention. In such drawings.

DETAILED DESCRIPTION OF THE PREFERRED EMBODIMENT

Figure 1:
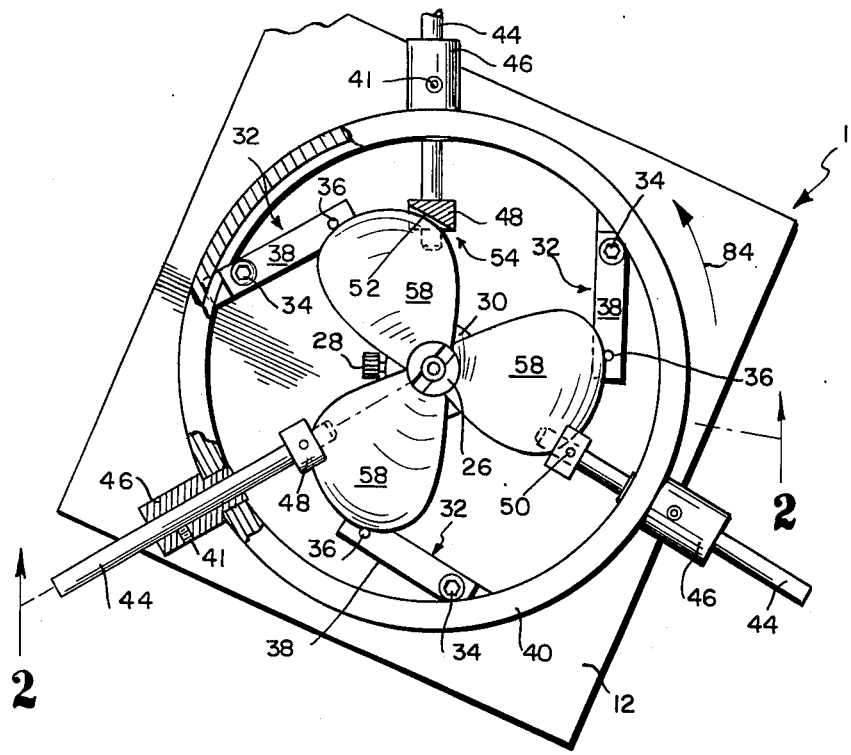
FIG. 1 is a top plan view of the propeller making apparatus of this invention.
Figure 2:
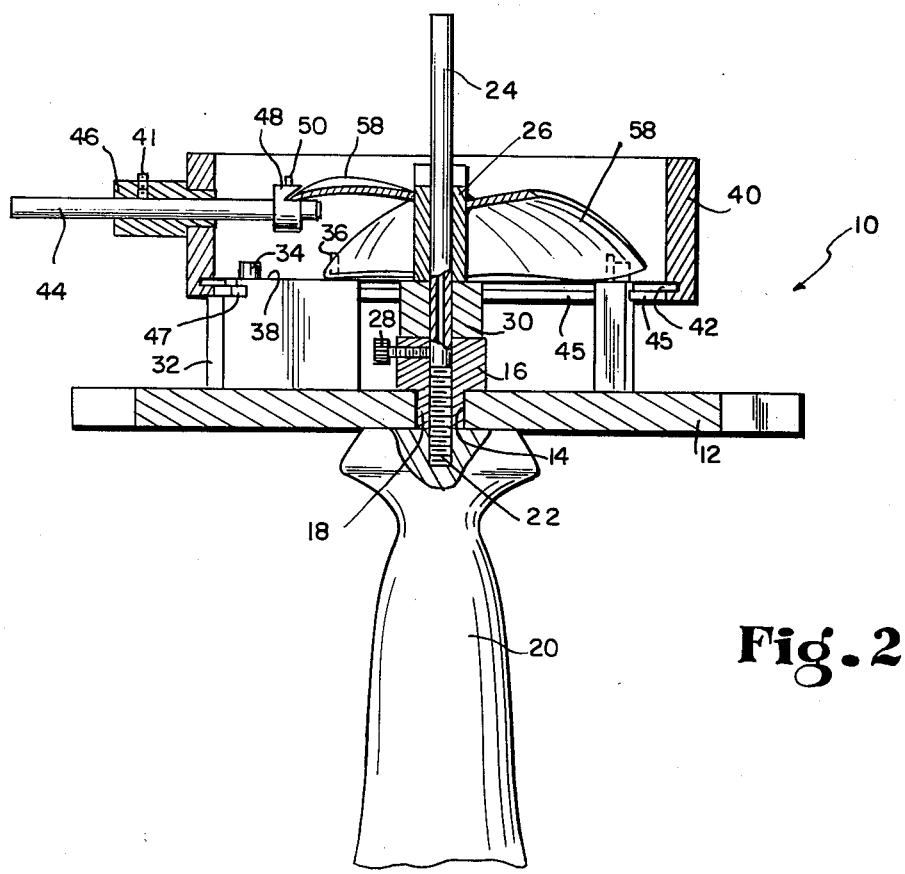
FIG. 2 is a fragmented vertical section of the propeller making apparatus taken on the line 2—2 of FIG. 1.
Figure 3:
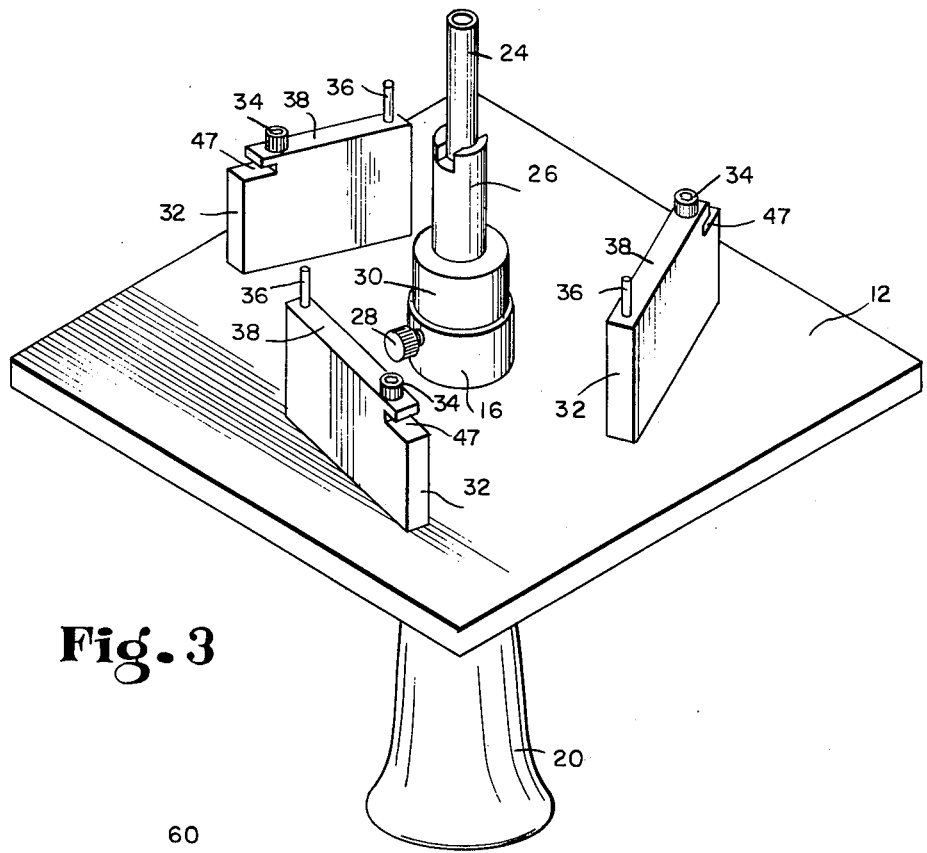
FIG. 3 is a perspective view of a portion of the apparatus.

The apparatus 10 of this invention for making propellers particularly for use with model boats is shown in FIGS. 1-3, and comprises a rectangular base plate 12 formed from aluminum or the like and having a central hole 14 formed therein. A spindle 16 has a reduced diameter lower portion 18 slidably received in the central hole 14. Conveniently, the lower portion 18 of the spindle 16 is internally threaded for connection to a handle 20 beneath the base plate 12 by a screw 22.

A central shaft 24 has its lower end received in the spindle 16, and extends vertically upwardly from the spindle and the base plate 12. The shaft 24 has a diameter chosen for snug reception thereover of a propeller hub 26. Conveniently, to accommodate different sizes of propeller hubs for different propellers, a variety of central shafts (not shown) can be provided, each having a lower end diameter for reception in the spindle and an upper end diameter for receiving the appropriate hub. Both the shaft 24 and the hub 26 are conveniently formed from a suitable material such as brass or carbon, and shaft 24 is anchored in the spindle 16 by a set screw 28. Moreover, to select the desired elevation of the hub 26 on the shaft 24, a cylindrical spacer 30 of a desired height is received about the shaft 24 between the spindle and hub.

A plurality of upstanding rectangular blocks 32 are mounted on the base plate 12 in an equiangular, radial arrangement. These blocks are machined from aluminum, brass, or the like, and correspond in number to the desired number of propeller blades to be attached to the propeller hub 26. The blocks 32 are identical in size and shape, and are each connected to the base plate 12 by a positioning screw 34 extending vertically therethrough adjacent one end thereof. Thus, as shown in FIGS. 1 and 3, three of the blocks 32 are provided when a three-bladed propeller is desired, with the positioning screws 34 being threadably received in the base plate 12 at equal radial distances from the central shaft 24 and at 120° intervals.

Each of the blocks 32 has a pin 36 extending upwardly from its upper face 38 at the end opposite the positioning screw 34. These pins 36 are thus swingable toward and away from the central shaft 24 along with their blocks 32 when the positioning screws 34 are loosened. Similarly, the pins 36 are fixed in position when the positioning screws 34 are tightened. In this manner, the radial distance of each pin 36 from the central shaft 24 is selectively adjustable.

A cylindrical collar 40 which is also formed from aluminum, brass, or the like is machined to have an inside diameter sized for snug reception about the heads of the positioning screws 34, as shown in FIG. 1. Conveniently, when the positioning screws 34 are loosened to permit arcuate swinging of the pins 36, sufficient lateral play of said screws is obtained to allow easy reception of the collar thereover. Then, when the positioning screws 34 are tightened, the collar 40 is snugly received about the screws and is rotatable with respect to the blocks 32 in contact with the upper faces 38 thereof with little or no play. Conveniently, to maintain the collar 40 in abutting relation with the positioning screws 34, the collar has an internally formed ring 42, or recess, near the lower planar face 43 thereof. Said ring 42 provides a lower collar rim 45 which is receivable in slots 47 in the ends of the blocks 32 adjacent the positioning screws 34. Thus, the collar is fixed with respect to the blocks 32 in the desired plane with respect thereto.

The collar 40 has a plurality of arms 44 spaced equiangularly about the circumference thereof. The number of arms 44 corresponds in number to the number of blocks 32, and accordingly three of said arms are shown in FIG. 1 at 120° intervals. Each arm 44 extends through the collar 40 and an external bushing 46 radially inwardly toward the central shaft 24, with its radial position being selectively fixed by means of a small set screw 41 on the bushing. Each arm 44 also has a collet 48 mounted thereon near the inner end thereof. Each collet 48 is fixed in position by a set screw 50, and has a slot 52 on the inwardly presented face 54 thereof. Conveniently, the slot on each collet opens toward one side of the collet, and is closed on the other side of the collet as shown in FIG. 1.

Figure 4:
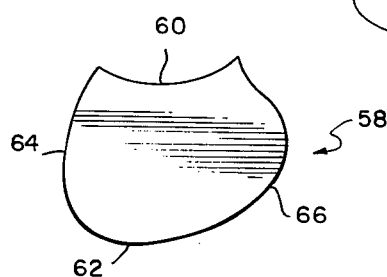
FIG. 4 is a plan view of a blade blank.
Figure 5:
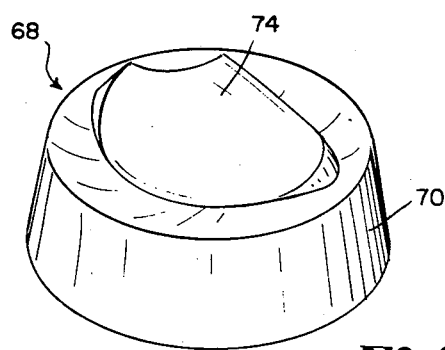
FIG. 5 is a perspective view of the lower portion of a die for use in shaping a blade blank.
Figure 6:
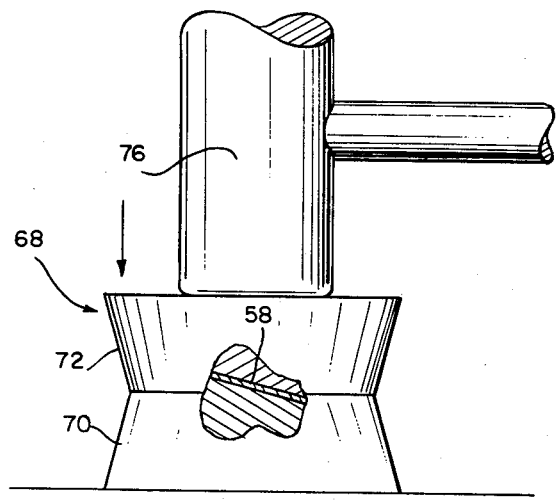
FIG. 6 is an elevation view of the complete die of FIG. 5.

A plurality of identical propeller blade blanks 58 are used in the apparatus and method of this invention to make propellers, with one of said blanks and the method of shaping thereof being shown by way of example in FIGS. 4-6. As shown, the blade blank 58 has a recessed arcuate root 60 shaped for broad surface contact with the propeller hub 26. The blade blank has a trailing edge 64 comprising a generally straight surface from the root to the blade tip 62, whereas the leading edge 66 sweeps through a long arc from the root to the tip. Further, while one specific blade blank shape is shown, it should be understood that a wide variety of blade shapes are possible.

The blade blanks 58 are formed from stainless steel or the like, and are desirably shaped individually as shown in FIGS. 5 and 6, to obtain a given set of design characteristics such as blade curvature, etc. That is, the blade blanks 58 can be shaped by means of a die 68 having a lower half 70 and an upper half 72. As shown, the die lower half 70 has a shaped projection 74 corresponding to the desired final shape of a blade blank 58. The blade blank is shaped by placing the blank in the die 68, and then placing the die upper half 72 thereover. Importantly, the die upper half has a recess (not shown) shaped complementary to the lower half projection 74. Thus, by striking the die upper half 72 with a hammer or mallet 76 as shown in FIG. 6, the blade blank is shaped according to the design characteristics defined by the die.

Figure 7:
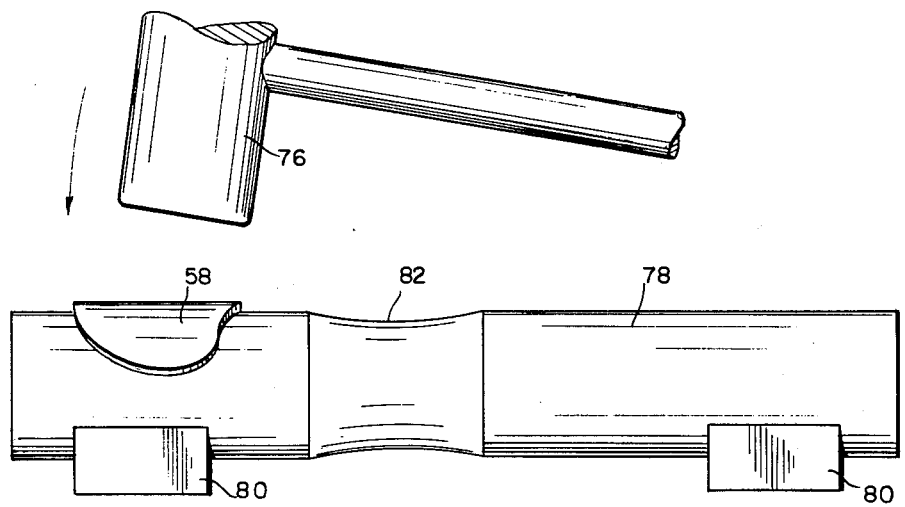
FIG. 7 is an elevation view showing alternate apparatus for shaping a blade blank.

Alternate apparatus for shaping blade blanks 58 is shown in FIG. 7. As shown, a mandrel 78 of metal or the like is positioned by supports 80. The mandrel has a circular cross section which has recessed arcuate portions 82, as well as varying diameter sections (not shown) if desired. To shape a blade blank, the blank 58 is placed over the mandrel and then formed to the desired curvature, etc. by means of the mallet 76.

Figure 8:
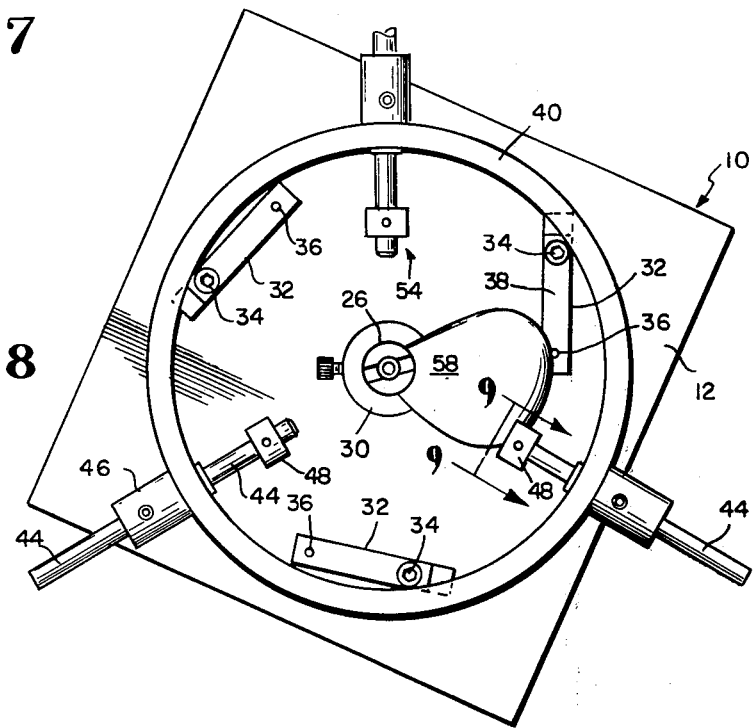
FIG. 8 is a top plan view similar to FIG. 1, and showing the positioning of a blade blank in said apparatus.
Figure 9:
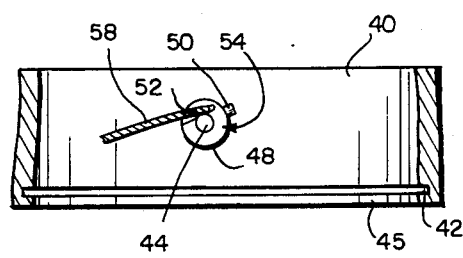
FIG. 9 is an enlarged fragmented vertical section taken on the line 9—9 of FIG. 8.

To make a propeller, propeller blade blanks 58 are inserted into the apparatus 10 one at a time, as shown in FIG. 8, with their trailing edges 64 presented downwardly. The curved root 60 of the blade blank is placed in contact with the propeller hub 26, and the tip 62 of the blank is rested upon the top face 38 of one of the blocks 32 in contact with the pin 36 thereon. For this, the block 32 is pivoted about its positioning screw 34 to place its pin 36 in contact with the blank tip 62, and the positioning screw is tightening to fix the block in position. Then, as shown in FIG. 9, the collar 40 is rotated and one of its arms 44 is adjusted for reception of the blade blank leading edge 66 in the open side of the collet slot 52. Thus, the blade blank 58 is secured in position by virtue of its three points of contact with the hub 26, pin 36, and collet 48. The specific pitch angle of the blade blank with respect to the hub is dependent upon the straight line distance, as best viewed in FIG. 8, between the associated collet 48 and block pin 36. Further, the so-called sweep back angle, or angle at which the blade trailing edge extends below the hub 26, is controlled by the height of the spacer 30.

In the embodiment shown in FIG. 8, two additional propeller blade blanks 58 are installed in the same manner as the one shown to form a three-blade propeller. That is, two additional blanks are positioned, one at a time, in contact with the hub 26 and a pin 36 on a block 32. For this, the blocks are swung about their positioning screws 34 and then fastened in position with their pins in contact with a blade. Also, the remaining two collar arms 44 are adjusted so that the leading edges 66 of the blade blanks are received in open sides of the slots 52 of the remaining two collets 48. Importantly, once the first blade blank 58 is positioned, the remaining blade blanks assume the same pitch angle with respect to the hub 26. This is because the pins 36 on the blocks 32 are fixed at equal angular intervals for a given size of blade blanks, and the equiangularly arranged collar arms 44 are fixed with respect to each other. Once each collar is positioned with respect to a pin 36, the remaining arms 44 are automatically properly positioned with respect to their associated pins.

The specific pitch angle of the propeller is selected by rotating the collar 40 with respect to the blocks 32 and the hub 26, as shown by the arrow 84 in FIG. 1. That is, counterclockwise rotation of the collar causes the collar arms 44 to move closer to their associated pins 36, and thereby lift the leading edges 66 of the blade blanks with respect to their trailing edges 64 to increase the propeller pitch angle. That is, the leading edges of the blanks slide within the slots 62 in the collets 48 as the blade blanks are pivoted upwardly about their tips 62 on the pins 36. Similarly, reverse rotation of the collar serves to lower the blade blanks to correspondingly decrease propeller pitch angle.

Figure 10:
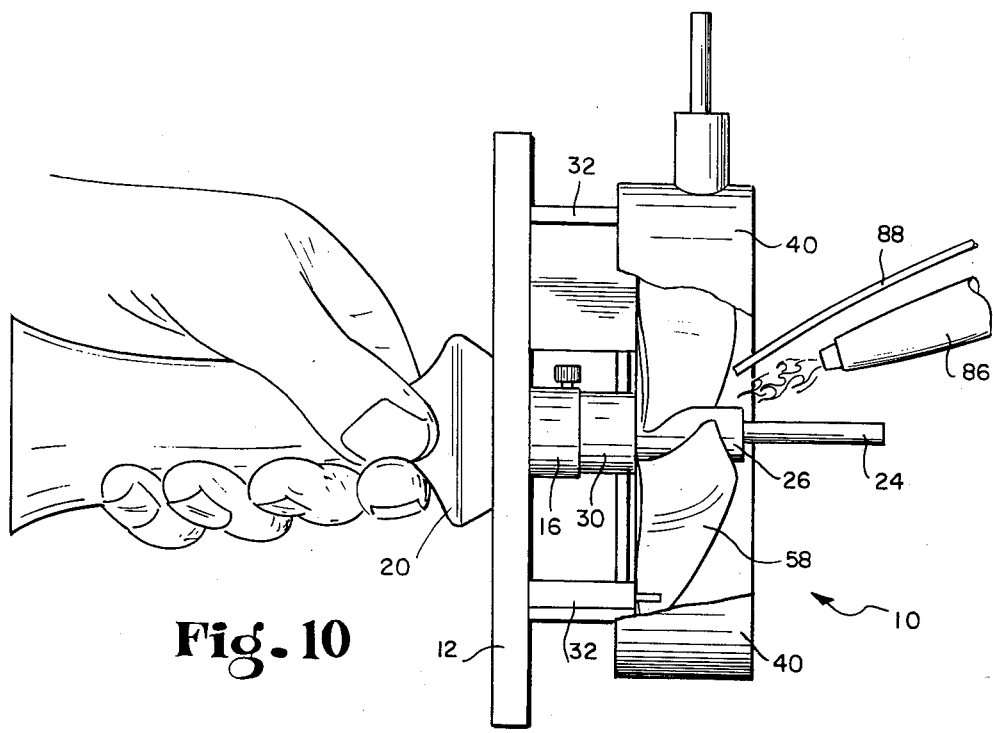
FIG. 10 is a fragmented vertical section of the apparatus illustrating means of connecting blade blanks to a hub.

When the desired pitch angle is obtained, the blade blanks 58 are silver soldered or brazed to the hub 26 to form the finished propeller. As shown in FIG. 10, this is desirably accomplished by grasping the underlying handle 20 and turning the entire apparatus 10 on its side. This allows easy access and control of a soldering torch 86 and a length of solder material 88. When completed, the propeller is removed from the shaft 24 for any necessary machining or smoothing of the soldered joints.

The propeller making apparatus of this invention is usable for making a wide variety of propellers of different sizes and using differenty shaped blade blanks. For example, the radially adjustable pins 36 and similarly adjustable collar arms 44 enable propellers to be made having a diameter of up to slightly less than the diameter of the collar 40. Or, if desired, the pins 36 and the collar arms 44 can be fixed in position so that the apparatus is usable to make only a single size of propeller. And, while hand-held apparatus for making model boat propellers is shown and described above, the propeller making apparatus and method is not limited to any particular size of propeller. Different sizes are possible by varying the dimensions of the plate 12, blocks 32, and collar 40.

Propellers made from the apparatus and method of this invention are advantageous in that the propeller blade pitch angle is accurately controllable. If a particular propeller does not provide for optimum boat performance, the blades and hub are easily disassembled by melting the soldered blade-hub joints. Then, the propeller can be re-made with the apparatus of this invention to have a different blade pitch angle, sweep back angle, etc., without any blade grinding or re-shaping being required. In this manner, the propeller can be designed and re-designed until optimum boat performance is achieved.

Figure 11:
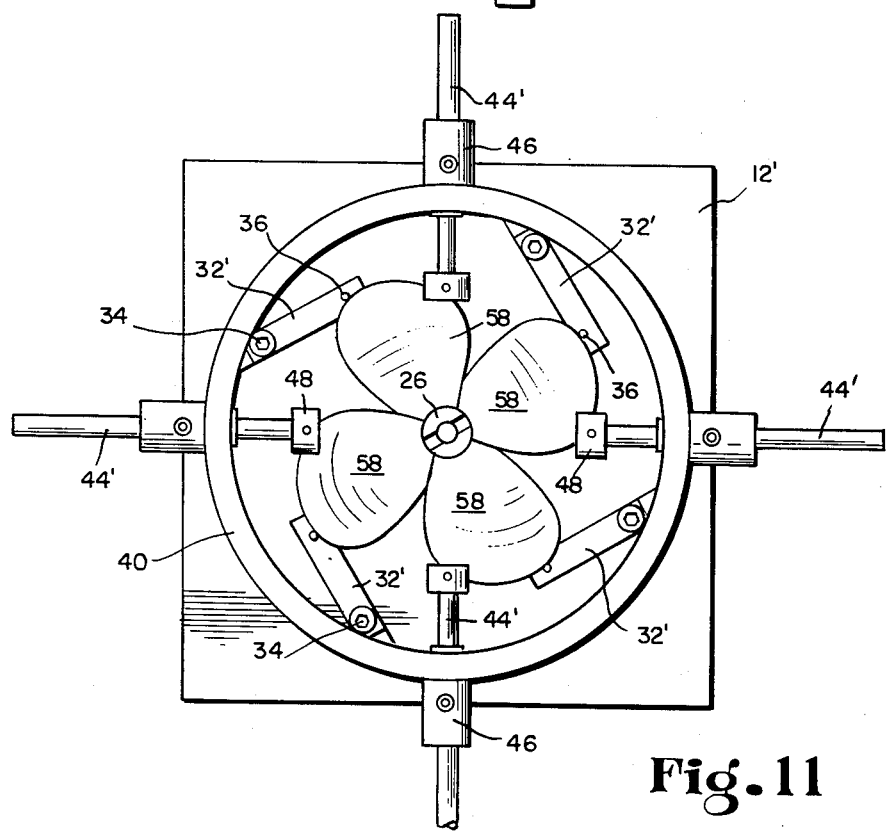
FIG. 11 is a top plan view similar to FIG. 1 of a modified form of the propeller making apparatus.

As shown in FIG. 11, the propeller making apparatus of this invention can be modified to make propellers having different numbers of blades. For example, with four blocks 32' mounted on a plate 12' at 90° intervals and with four collar arms 44' similarly mounted at 90° intervals, a four bladed propeller can be made. Similarly, with two blocks 32' and two collar arms 44' each at 180° intervals, a two-bladed propeller can be made. Further, if desired, a single base plate 12' and collar 40' can be provided for mounting different numbers of blocks and collar arms at appropriate angular intervals to permit making of propellers having different numbers of blades.

I claim:

1. A method of making a propeller from a propeller hub and a plurality of propeller blade blanks, comprising the steps of receiving the propeller hub over a vertically extending shaft fixed to a base; positioning the blade blanks in contact with said hub and with a plurality of support means corresponding in number to the number of blade blanks and equiangularly arranged on said base radially outwardly from said hub; receiving one edge of each blade blank in holding means disposed above said support means whereby each blade blank is supported by contact with said hub, one of said support means, and said holding means; rotating said holding means with respect to said support means to selectively alter the pitch angle of the blade blanks with respect to said hub; and connecting each of the blade blank to the hub.

2. A method of making a propeller as set forth in claim 1 wherein the radial distance of each of said support means from said hub is adjustable, and including the additional step of selectively adjusting said support means to correspond to the size of the blade blanks.

3. A method of making a propeller as set forth in claim 1 wherein said holding means comprises a plurality of radially adjustable arms corresponding in number to the number of blade blanks and equiangularly arranged on a collar rotatably positioned with respect to said support means, and including the additional step of selectively adjusting said arms to correspond to the size of the blade blanks.

4. A method of making a propeller from a propeller hub and a plurality of propeller blade blanks, comprising the steps of receiving the propeller hub over a vertically extending shaft fixed to a base; positioning the blade blanks in contact with said hub and with a plurality of support means corresponding in number to the number of blade blanks and equiangularly arranged on said base radially outwardly from said hub; receiving one edge of each blade blank in holding means including a plurality of radially adjustable arms corresponding in number to the number of blade blanks and equiangularly arranged on a collar disposed above said support means and rotatable with respect thereto, selectively adjusting said arms to correspond to the size of the blade blanks whereby each blade blank is supported by contact with said hub, one of said support means, and one of said arms; and connecting each of the blade blanks to the hub.

5. A method of making a propeller as set forth in claim 4 including the additional step of rotating said holding means with respect to said support means to selectively alter the pitch angle of the blade blanks with respect to said hub.

6. A method of making a propeller as set forth in claim 4 wherein the radial distance of each of said support means from said hub is adjustable, and including the additional step of selectively adjusting said support means to correspond to the size of the blade blanks.

* * * * *

UNITED STATES PATENT OFFICE
CERTIFICATE OF CORRECTION

Patent No. 4,058,880　　　　　　　　Dated　November 22, 1977

Inventor(s)　Emerson Dee Hughey

It is certified that error appears in the above-identified patent and that said Letters Patent are hereby corrected as shown below:

Column 2, line 18, change "become" to --becoming--.

Column 4, line 49, change "tightening" to --tightened--.

Column 5, line 10, change "each" (second occurrence) to --one--.

Column 5, line 22, change "62" to --52--.

Column 5, line 38, change "differenty" to --differently--.

Column 6, line 24, change "blank" to --blanks--.

Signed and Sealed this

Fourth Day of April 1978

[SEAL]

Attest:

RUTH C. MASON  
*Attesting Officer*

LUTRELLE F. PARKER  
*Acting Commissioner of Patents and Trademarks*